US011829477B2

(12) United States Patent
Karpov et al.

(10) Patent No.: US 11,829,477 B2
(45) Date of Patent: Nov. 28, 2023

(54) CONCEPT FOR CONTROLLING ACCESS TO A DATA MEMORY

(71) Applicant: Sony Corporation, Tokyo (JP)

(72) Inventors: Alexei Karpov, Tokyo (JP); Geoffrey Van Den Berge, Tokyo (JP); Stefan Rabin, Tokyo (JP)

(73) Assignee: SONY CORPORATION, Tokyo (JP)

( * ) Notice: Subject to any disclaimer, the term of this patent is extended or adjusted under 35 U.S.C. 154(b) by 444 days.

(21) Appl. No.: 17/203,763

(22) Filed: Mar. 17, 2021

(65) Prior Publication Data

US 2021/0303688 A1 Sep. 30, 2021

(30) Foreign Application Priority Data

Mar. 24, 2020 (EP) ..................................... 20165333

(51) Int. Cl.
*G06F 21/57* (2013.01)
*G06F 3/06* (2006.01)
*G06F 9/38* (2018.01)

(52) U.S. Cl.
CPC ............ *G06F 21/57* (2013.01); *G06F 3/0622* (2013.01); *G06F 3/0659* (2013.01); *G06F 3/0679* (2013.01); *G06F 9/3836* (2013.01)

(58) Field of Classification Search
None
See application file for complete search history.

(56) References Cited

U.S. PATENT DOCUMENTS

| 2004/0078590 | A1 | 4/2004 | Ellison et al. |
| 2014/0089617 | A1 | 3/2014 | Polzin et al. |
| 2015/0067838 | A1 | 3/2015 | Gunti et al. |
| 2016/0292423 | A1 | 10/2016 | Yao et al. |
| 2019/0236179 | A1* | 8/2019 | Priebe ................ G06F 16/2365 |
| 2020/0021445 | A1* | 1/2020 | Caceres ................ G06F 21/44 |

FOREIGN PATENT DOCUMENTS

CN 107016288 A 8/2017

* cited by examiner

*Primary Examiner* — Cai Y Chen
(74) *Attorney, Agent, or Firm* — XSENSUS LLP

(57) ABSTRACT

An apparatus for controlling access to a data memory is provided. The apparatus includes an input interface configured to receive a request from an external processor circuit for accessing a memory area of the data memory. The apparatus additionally includes a control circuit configured to determine whether the memory area is to be accessed exclusively from within a trusted execution environment. Further, if it is determined that the memory area is to be accessed exclusively from within the trusted execution environment, the control circuit is configured to control access to the memory area of the data memory based on security information indicating whether the external processor circuit is operating in a secure mode related to the trusted execution environment.

20 Claims, 1 Drawing Sheet

CONCEPT FOR CONTROLLING ACCESS TO A DATA MEMORY

CROSS-REFERENCE TO RELATED APPLICATION

This application claims priority from EP 20165333.4, filed on Mar. 24, 2020, the contents of which are incorporated by reference herein in its entirety.

FIELD

The present disclosure relates to controlling access to a data memory. In particular, examples relate to a method and an apparatus for controlling access to a data memory, a memory device and a semiconductor chip.

BACKGROUND

Many modern systems are dealing with sensitive information such as personal identifiable information or keys for Digital Rights Management (DRM). Various security controls supporting protection of such information on hardware and/or software level are available on the market. For example, obfuscation, encryption, Security-Enhanced Linux (SELinux), Address Space Layout Randomization (ASLR), Access Control List (ACL), memory protection technologies, Trusted Execution Environment (TEE), etc. are available. An application running on a device may have its own software security controls. For example, an application may run on an Operating System (OS), which in turn has its own security measures in place. Typically, an OS uses/relies on controls implemented in both software and hardware to make it more difficult for an attacker to fully compromise a target system. This approach is in line with one of the main security principles: defense in depth, i.e. the protection of assets with different controls on different levels.

Even though the security controls in many devices are manifold, there are still weaknesses allowing an attacker to get access to sensitive information. Further, it is not always possible to use hardware mitigation for each use case (e.g. due to financial constraints). In some cases, system designers need to rely on software security, which are usually weaker than hardware solutions.

Hence, there may be a desire for improved data security.

SUMMARY

This desire is met by apparatuses and methods in accordance with the independent claims. Advantageous embodiments are addressed by the dependent claims.

According to a first aspect, the present disclosure provides an apparatus for controlling access to a data memory. The apparatus comprises an input interface configured to receive a request from an external processor circuit for accessing a memory area of the data memory. The apparatus further comprises a control circuit configured to determine whether the memory area is to be accessed exclusively from within a trusted execution environment. If it is determined that the memory area is to be accessed exclusively from within the trusted execution environment, the control circuit is configured to control access to the memory area of the data memory based on security information indicating whether the external processor circuit is operating in a secure mode related to the trusted execution environment.

According to a second aspect, the present disclosure provides a method for controlling access to a data memory. The method comprises receiving a request from an external processor circuit for accessing a memory area of the data memory and determining whether the memory area is to be accessed exclusively from within a trusted execution environment. If it is determined that the memory area is to be accessed exclusively from within the trusted execution environment, the method further comprises controlling access to the memory area of the data memory based on security information indicating whether the external processor circuit is operating in a secure mode related to the trusted execution environment.

According to a third aspect, the present disclosure provides a memory device comprising a data memory and an apparatus for controlling access to the data memory according to the proposed technology.

According to a fourth aspect, the present disclosure provides a semiconductor chip comprising a memory device according to the proposed technology and a processor circuit external to the memory device. The processor circuit is configured to output the request for accessing the memory region of the data memory and the security information.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
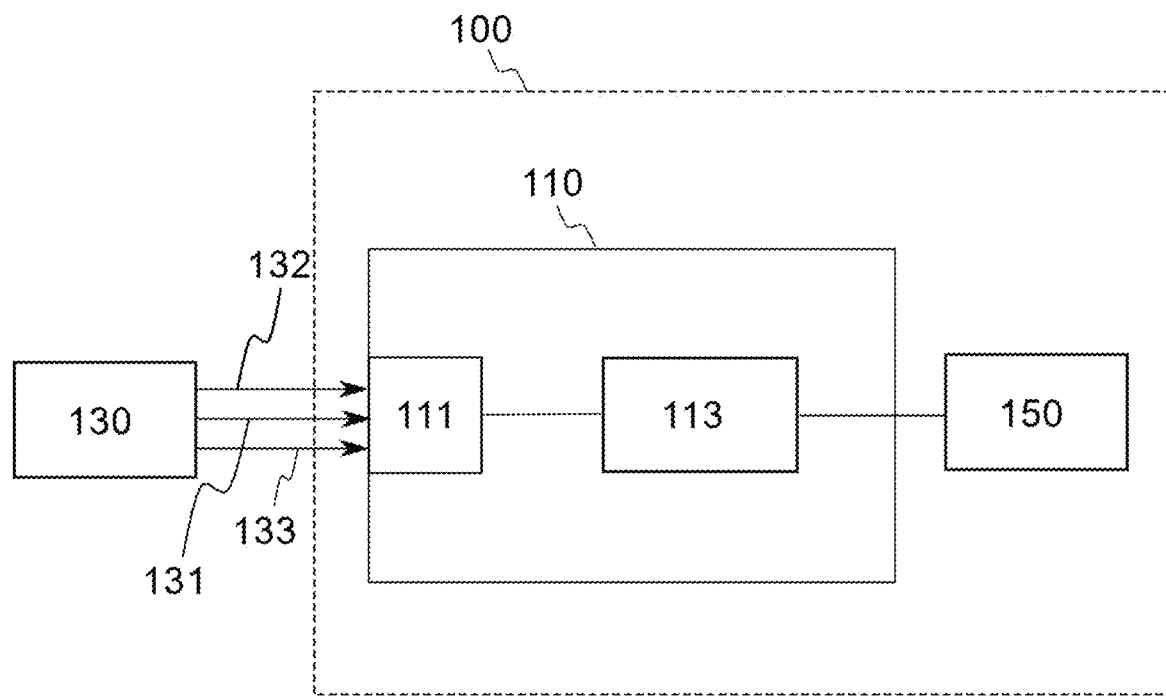
FIG. 1 illustrates an example of a system comprising a memory device.

FIG. 1 illustrates an example of a system comprising a memory device 100 and processor circuit 130 coupled to the memory device 100. The processor circuit 130 may be any type of processor device. The processor circuit 130 may, e.g., comprise a single dedicated processor, a single shared processor, or a plurality of individual processors, some of which or all of which may be shared. For example, the processor circuit 130 may be a Central Processing Unit (CPU).

The memory device 100 comprises a data memory 150 for storing data. The data memory 150 may be a single physical memory component or comprise a plurality of physical memory components (e.g., one or more NAND flash memories). For example, the data memory 150 may be a solid-state memory (i.e. a non-volatile data storage that stores and retrieves digital information using only electronic circuits, without any involvement of moving mechanical parts). The memory device 100 may, e.g., be one of a Solid-State Drive (SSD), an embedded Multi Media Card (eMMC) and a flash memory/drive. The memory device 100 additionally comprises an apparatus 110 coupled to (with) the data memory 150 for controlling access (e.g., read or write access) to the data memory 150.

For accessing the data memory 150, the processor circuit 130 is configured to output a request 131 for accessing a memory region of the data memory 150. For example, the request 131 may be a read request for reading a data file stored in the memory area of the data memory 150 or a write request for writing data into the memory area of the data memory 150. However, it is to be noted that the request 131 may further be any other type of request for accessing, creating and/or manipulating data in the memory region of the data memory 150.

The memory region of the data memory 150 is a subsection of the data memory 150 such as a sector of the data memory or a one of a plurality of physical memory components of the data memory. The data memory 150 may comprise a plurality of further memory regions. It is to be noted that any granularity may be used and that the memory region of the data memory 150 may be any other sub-section of the data memory 150 as well. For example, the granularity of the memory region of the data memory 150 may be selected based on the memory type of the memory device 100 or based on the type of operation on the memory device 100.

The apparatus 110 comprises an input interface 111 configured to receive the request 131 for accessing a memory area of the data memory 150 from the external processor circuit 130.

Further, the apparatus 110 comprises a control circuit 113 coupled to (with) the input interface 111. The control circuit 113 is configured to determine whether the memory area 150 is to be accessed exclusively (only) from within a Trusted Execution Environment (TEE). A TEE is a secure area inside the processor circuit 130. It runs in an isolated environment (e.g. in parallel to an OS). It guarantees that code and data loaded in the TEE are protected with respect to confidentiality and integrity. The TEE is isolated from the "normal" processing environment also known as the Rich Execution Environment (REE), where the processor circuit 130 runs regular applications or an OS.

If it is determined by the control circuit 113 that the memory area is to be accessed exclusively from within the TEE, the control circuit 113 is configured to control access to the memory area of the data memory 150 based on security information 132 indicating whether the external processor circuit 130 is operating in a secure mode related to the TEE.

If the memory area (e.g. a specific sector or a specific file stored in the data memory 150) is to be secured, the apparatus 110 may allow to ensure that the memory area is only accessible from within the TEE, i.e., only by applications executed in architecturally-protected execution environment of the processor circuit 130.

For example, (only) if the security information 132 indicates that the external processor circuit 130 is operating in the secure mode, the control circuit 113 may allow access to the memory area of the data memory 150. On the other hand, if the security information 132 indicates that the external processor circuit 130 is not operating in the secure mode, the control circuit 113 may deny access to the memory area.

If it is determined that the memory area is not to be accessed exclusively (only) from within the TEE, the control circuit 113 is configured to allow access to the memory area of the data memory 150 independent of the security information. That is, if the memory area is not to be secured, the apparatus 110 may allow normal access to the memory area. In other words, the access control is transparent for secure world and non-secure world applications trying to access non-secured memory areas of the data memory 150.

The processor circuit 130 is configured to output the security information 132 to the memory device 100 via a hardware interface (e.g. via one or more signal lines and/or solder connections). In other words, the input interface 111 of the apparatus 110 is configured to receive the security information 132 from the external processor circuit 130. For example, the security information 132 may be a status bit output by the external processor circuit 130. The processor circuit 130 (e.g. a CPU exhibiting a TEE) is often intrinsically able to provide the status bit such that information already present at the processor circuit 130 may be used for access control at the memory device 100. However, it is to be noted that the security information 132 need not be a status bit. In general, the security information 132 may be any data structure that can be output by the processor circuit 130 to the memory device 100 (e.g. a data word or a data code).

According to the proposed technology, the apparatus 110 of the memory device 100 (e.g. an SSD or a flash controller) is made aware of what mode the processing circuit 130 (e.g. a CPU) is running (secure mode related to TEE or non-secure mode related to REE). Based on the mode of the processing circuit 130, the apparatus 110 may restrict access to the memory area of the data memory 150 (e.g. a sector of the data memory 150) in case the memory area of the data memory 150 is to be accessed only from the secure world of the TEE. The proposed technology may be understood as a hardware solution as the state of the processing circuit 130 is reported via hardware lines to the apparatus 110 of the memory device 100. As described above, information intrinsically present at the processing circuit 130 may be used for the security information 132 indicating whether the processor circuit 130 is operating in the secure mode related to the TEE.

For example, if an attacker identifies a vulnerability in an OS running in the REE of the processing circuit 130, the attacker may gain root privileges despite the TEE of the processing circuit 130. Given the root privileges, the attacker may access substantially any file stored on a conventional memory. For example, the attacker may access a file containing firmware for further analysis in order to find more security issues. By breaking the security models of the OS and optionally an application running on the OS, the attacker may do basically whatever he/she desires. However, even though the attacker may have gained root privileges, the proposed technology may prevent the attacker from gaining access to the memory area of the data memory 150. If the attacker tries to access a file stored in the memory area of the data memory 150 that is to be exclusively accessed from with the TEE, the control circuit 113 will deny access as the attacker cannot access the TEE of the processing circuit 130—even with the root privileges. Since the attacker is not able to access the TEE, the attacker also is not able to access the file in the secured memory area of the data memory 150. The attacker would have to break into the TEE, which requires way more effort. Accordingly, the proposed technology may block an attacker to access sensitive information in the memory area of the data memory 150 even though the attacker has root privileges.

As described above, the control circuit 113 determines whether the memory area is to be accessed exclusively from within the TEE prior to performing access control based on the security information 132. For example, the control circuit 113 may determine whether the memory area is to be accessed exclusively from within the TEE based on a status information stored in the data memory 150. The status information indicates whether the memory area of the data memory 150 is to be accessed exclusively from within the TEE. The status information may, e.g., be a status bit (which may be understood as a logical TEE binary bit) stored in the data memory 150. However, it is to be noted that the status information need not be a status bit. In general, the status information may be any data structure that can be stored in the data memory 150 (e.g. a data word or a data code). The status information is a kind of permission indicator to the memory area (e.g. a memory sector) of the data memory 150 for marking the memory area as accessible from only the secure world (i.e. from within the TEE) or as accessible also from the non-secure world (i.e. from within the TEE and the REE). Accordingly, the status information may allow to indicate memory areas of the data memory 150 for storing files which can only be accessed when the processor circuit 130 is running in the secure mode. As described above, access (e.g. read or write access) to the files is then only allowed from within the TEE.

According to proposed technology, the status information may only be updated from within the TEE. For example, if the input interface 111 receives another request 133 from the external processor circuit 130 for changing the status information. The control circuit 113 may change the status information according to the other request 133 exclusively (only) if the security information 132 indicates that the external processor circuit 130 is operating in the secure mode related to the TEE. Accordingly, it may be ensured that the status information is not changed by an attacker from within the REE in order to get access to the secured memory area of the data memory 150. For example, if the status information is a status bit, the status may only be changed if the processor circuit 130 changed its mode to the TEE state. For example, the request 133 for changing the status information may be issued by an OS running on the processor circuit 130 or an application running on the OS which can access the TEE by means of a dedicated trustlet. The application may, e.g., be able to authenticate itself before being able to use the trustlet. The proposed technology may be used by the OS to mark and/or unmark specific areas/sectors of the data memory 150 as secure memory areas depending on the type or purpose of the data to be stored in the specific areas/sectors (e.g. data files containing firmware). For example, this may be done at boot-up of the system or as part of the manufacturing process for the memory device 100.

As described in the above examples, the TEE state is synchronized between the memory device 100 and the external processor circuit 130 at hardware level.

According to the proposed technology, the memory device 100 may perform access control verification for memory areas of the data memory 150 to be accessed exclusively from within the TEE regardless of the operation mode of the processor circuit 130 and block access to, e.g., specified sectors or files flagged with according status information when it determines that the processing circuit 130 is not running in the TEE state.

According to some examples, the system illustrated in FIG. 1 may be implemented in a common semiconductor chip (or semiconductor die). In other words, the system illustrated in FIG. 1 may be implemented as a System on a Chip (SoC). Similar to what is described above, the semiconductor chip (die) may comprise a hardware interface in addition to the memory device 100 and the processor circuit 130 for coupling the processor circuit 130 and the memory device 100. The hardware interface may, e.g., comprises one or more signal lines, one or more vias and/or one or more solder connections formed in the semiconductor chip. Forming the hardware interface in the semiconductor chip or the semiconductor die may increase the security of the system as the hardware interface is hard to access for an attacker. Accordingly, physical manipulation of the security information by an attacker may be hampered. For example, the hardware interface may be covered by one or more layers, coatings and/or housings of the semiconductor chip (die).

Figure 2:
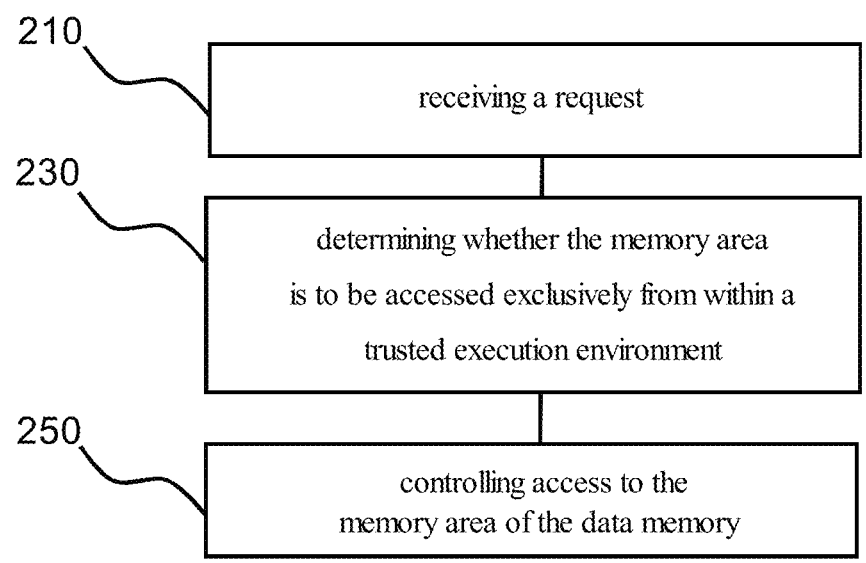
FIG. 2 illustrates a flow chart of an example of a method for controlling access to a data memory.

FIG. 2 illustrates a flow chart of an example of a method 200 for controlling access to a data memory according to the proposed technology. The method 200 comprises a step 210 of receiving a request from an external processor circuit for accessing a memory area of the data memory.

Further, the method 200 comprises a step 230 of determining whether the memory area is to be accessed exclusively from within a TEE. If it is determined that the memory area is to be accessed exclusively from within the TEE, the method 200 comprises a step 250 of controlling access to the memory area of the data memory based on security information indicating whether the external processor circuit is operating in a secure mode related to the TEE.

If the attacker tries to access a file stored in the memory area of the data memory that is to be exclusively accessed from with the TEE, the access would be denied as the attacker cannot access the TEE—even with the root privileges. The attacker would have to break into the TEE, which requires way more effort. Accordingly, the proposed technology may block an attacker to access sensitive information in the memory area of the data memory.

More details and aspects of the method 200 are mentioned in connection with the proposed technique or one or more examples described above (e.g. FIG. 1). The method may comprise one or more additional optional features corresponding to one or more aspects of the proposed technique or one or more examples described above.

The following examples pertain to further embodiments:

(1) An apparatus for controlling access to a data memory, the apparatus comprising:
an input interface configured to receive a request from an external processor circuit for accessing a memory area of the data memory;
a control circuit configured to:
determine whether the memory area is to be accessed exclusively from within a TEE; and
if it is determined that the memory area is to be accessed exclusively from within the TEE, control access to the memory area of the data memory based on security information indicating whether the external processor circuit is operating in a secure mode related to the TEE.

(2) The apparatus of (1), wherein the control circuit is configured to:
allow access to the memory area of the data memory if the security information indicates that the external processor circuit is operating in the secure mode; and
deny access to the memory area of the data memory if the security information indicates that the external processor circuit is not operating in the secure mode.

(3) The apparatus of (1) or (2), wherein the control circuit configured to determine whether the memory area is to be accessed exclusively from within the TEE based on status information stored in the data memory, wherein the status information indicates whether the memory area of the data memory is to be accessed exclusively from within the TEE.

(4) The apparatus of (3), wherein the input interface is further configured to receive a request from the external processor circuit for changing the status information, and wherein the control circuit is further configured to change the status information according to the request exclusively if the security information indicates that the external processor circuit is operating in the secure mode.

(5) The apparatus of (3) or (4), wherein the status information is a status bit stored in the data memory.

(6) The apparatus of any of (1) to (5), wherein, if it is determined that the memory area is not to be accessed exclusively from within the TEE, the control circuit is configured to allow access to the memory area of the data memory independent of the security information.

(7) The apparatus of any of (1) to (6), wherein the security information is a status bit output by the external processor circuit.

(8) The apparatus of any of (1) to (7), wherein the input interface is further configured to receive the security information from the external processor circuit.

(9) The apparatus of any of (1) to (8), wherein the request for accessing the memory area of the data memory is one of a read request for reading a data file stored in the memory area of the data memory or a write request for writing data into the memory area of the data memory.

(10) A memory device, comprising:
a data memory; and
an apparatus according to any of (1) to (9) for controlling access to the data memory.

(11) The memory device of (10), wherein the data memory is a solid-state memory.

(12) The memory device of (10) or (11), wherein the memory device is one of a solid-state drive, an embedded multimedia card and a flash drive.

(13) A semiconductor chip, comprising:
a memory device according to (10) or (11); and
a processor circuit external to the memory device, wherein the processor circuit is configured to output the request for accessing the memory region of the data memory and the security information.

(14) The semiconductor chip of (13), further comprising:
a hardware interface arranged within the semiconductor chip and configured to couple the processor circuit and the memory device,
wherein the processor circuit is configured to output the security information to the memory device via the hardware interface.

(15) A method for controlling access to a data memory, the method comprising:
receiving a request from an external processor circuit for accessing a memory area of the data memory;
determining whether the memory area is to be accessed exclusively from within a TEE; and
if it is determined that the memory area is to be accessed exclusively from within the TEE, controlling access to the memory area of the data memory based on security information indicating whether the external processor circuit is operating in a secure mode related to the TEE.

(16) The method of (15), wherein controlling access to the memory area of the data memory comprises:
allowing access to the memory area of the data memory if the security information indicates that the external processor circuit is operating in the secure mode; and
denying access to the memory area of the data memory if the security information indicates that the external processor circuit is not operating in the secure mode.

(17) The method of (15) or (16), wherein determining whether the memory area is to be accessed exclusively from within the TEE comprises:
determining whether the memory area is to be accessed exclusively from within the TEE based on status information stored in the data memory, wherein the status information indicates whether the memory area of the data memory is to be accessed exclusively from within the TEE.

(18) The method of (17), further comprising:
receiving a request from the external processor circuit for changing the status information; and
changing the status information according to the request exclusively if the security information indicates that the external processor circuit is operating in the secure mode.

(19) The method of any of (15) to (18), further comprising:
allowing access to the memory area of the data memory independent of the security information if it is determined that the memory area is not to be accessed exclusively from within the TEE.

(20) The method of any of (15) to (19), further comprising:
receiving the security information from the external processor circuit.

(21) A non-transitory machine-readable medium having stored thereon a program having a program code for performing the method for controlling access to a data memory according to any of (15) to (20), when the program is executed on a processor or a programmable hardware.

(22) A program having a program code for performing the method for controlling access to a data memory according to any of (15) to (20), when the program is executed on a processor or a programmable hardware.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented a non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus for controlling access to a data memory, the apparatus comprising:
    an input interface configured to receive a request from an external processor circuit for accessing a memory area of the data memory;
    a control circuit configured to:
    determine whether the memory area is to be accessed exclusively from within a trusted execution environment; and
    if it is determined that the memory area is to be accessed exclusively from within the trusted execution environment, control access to the memory area of the data memory based on security information indicating whether the external processor circuit is operating in a secure mode related to the trusted execution environment.

2. The apparatus of claim 1, wherein the control circuit is configured to:
    allow access to the memory area of the data memory if the security information indicates that the external processor circuit is operating in the secure mode; and
    deny access to the memory area of the data memory if the security information indicates that the external processor circuit is not operating in the secure mode.

3. The apparatus of claim 1, wherein the control circuit configured to determine whether the memory area is to be accessed exclusively from within the trusted execution environment based on status information stored in the data memory, wherein the status information indicates whether the memory area of the data memory is to be accessed exclusively from within the trusted execution environment.

4. The apparatus of claim 3, wherein the input interface is further configured to receive a request from the external processor circuit for changing the status information, and wherein the control circuit is further configured to change the status information according to the request exclusively if the security information indicates that the external processor circuit is operating in the secure mode.

5. The apparatus of claim 1, wherein the status information is a status bit stored in the data memory.

6. The apparatus of claim 1, wherein, if it is determined that the memory area is not to be accessed exclusively from within the trusted execution environment, the control circuit is configured to allow access to the memory area of the data memory independent of the security information.

7. The apparatus of claim 1, wherein the security information is a status bit output by the external processor circuit.

8. The apparatus of claim 1, wherein the input interface is further configured to receive the security information from the external processor circuit.

9. The apparatus of claim 1, wherein the request for accessing the memory area of the data memory is one of a read request for reading a data file stored in the memory area of the data memory or a write request for writing data into the memory area of the data memory.

10. A memory device, comprising:
   a data memory; and
   an apparatus according to claim 1 for controlling access to the data memory.

11. The memory device of claim 10, wherein the data memory is a solid-state memory.

12. The memory device of claim 10, wherein the memory device is one of a solid-state drive, an embedded multimedia card and a flash drive.

13. A semiconductor chip, comprising:
   a memory device according to claim 10; and
   a processor circuit external to the memory device, wherein the processor circuit is configured to output the request for accessing the memory region of the data memory and the security information.

14. The semiconductor chip of claim 13, further comprising:
   a hardware interface arranged within the semiconductor chip and configured to couple the processor circuit and the memory device,
   wherein the processor circuit is configured to output the security information to the memory device via the hardware interface.

15. A method for controlling access to a data memory, the method comprising:
   receiving a request from an external processor circuit for accessing a memory area of the data memory;
   determining whether the memory area is to be accessed exclusively from within a trusted execution environment; and
   if it is determined that the memory area is to be accessed exclusively from within the trusted execution environment, controlling access to the memory area of the data memory based on security information indicating whether the external processor circuit is operating in a secure mode related to the trusted execution environment.

16. The method of claim 15, wherein controlling access to the memory area of the data memory comprises:
   allowing access to the memory area of the data memory if the security information indicates that the external processor circuit is operating in the secure mode; and
   denying access to the memory area of the data memory if the security information indicates that the external processor circuit is not operating in the secure mode.

17. The method of claim 15, wherein determining whether the memory area is to be accessed exclusively from within the trusted execution environment comprises:
   determining whether the memory area is to be accessed exclusively from within the trusted execution environment based on status information stored in the data memory, wherein the status information indicates whether the memory area of the data memory is to be accessed exclusively from within the trusted execution environment.

18. The method of claim 17, further comprising:
   receiving a request from the external processor circuit for changing the status information; and
   changing the status information according to the request exclusively if the security information indicates that the external processor circuit is operating in the secure mode.

19. The method of claim 15, further comprising:
   allowing access to the memory area of the data memory independent of the security information if it is determined that the memory area is not to be accessed exclusively from within the trusted execution environment.

20. The method of claim 15, further comprising:
   receiving the security information from the external processor circuit.

* * * * *